Patented Oct. 6, 1931

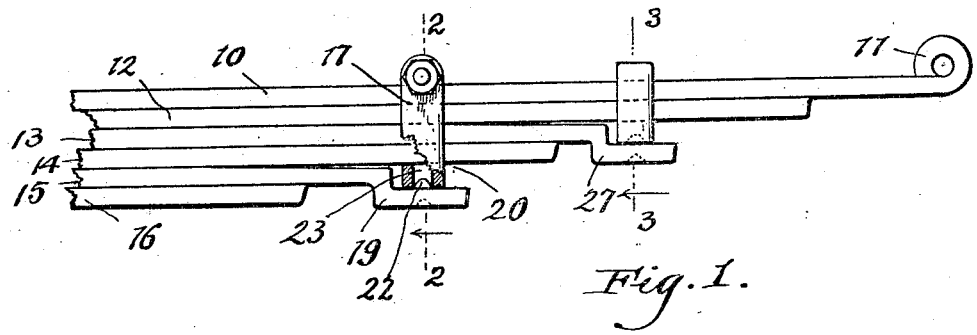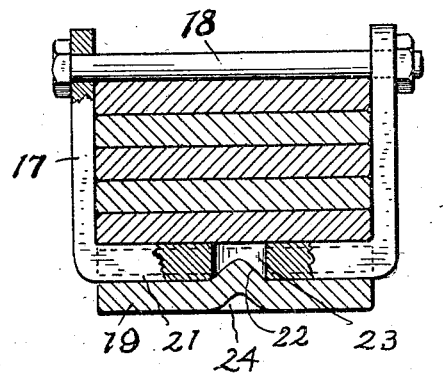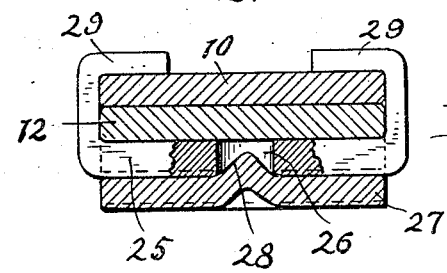

1,826,103

UNITED STATES PATENT OFFICE

WILLIAM H. WALLACE, OF DETROIT, MICHIGAN, ASSIGNOR, BY MESNE ASSIGNMENTS, TO THE EATON AXLE & SPRING COMPANY, OF CLEVELAND, OHIO, A CORPORATION OF OHIO

SPRING

Application filed July 5, 1928. Serial No. 290,539.

This invention relates to vehicle springs and more particularly to multiple-leaf springs that are especially adapted for use in automobiles.

Multiple-leaf springs are commonly provided with clips by which the leaves are clamped together and held in their proper relationship and it is the object of the present invention to provide an improved form of clip that will be as efficient as clips heretofore used and less expensive to manufacture and assemble.

In the form of spring clips now commonly used, it is customary to rivet them to the end of a spring leaf for the purpose of securing the clip against displacement longitudinally of the spring and my invention eliminates the necessity for riveting the clip to one of the leaves and, at the same time, insures that the clip will be retained in its proper position. The features and advantages of my invention will be more apparent from the following description taken in connection with the accompanying drawings, of which—

Fig. 1 is a side elevation of one end of a semi-elliptic multiple-leaf spring embodying the invention, certain parts being broken away;

Fig. 2 is an enlarged transverse section on the line 2—2 of Fig. 1; and

Fig. 3 is an enlarged transverse section on the line 3—3 of Fig. 1.

Referring to the drawings, 10 indicates one end of the main leaf of a multiple-leaf spring, this leaf being provided with an eye 11 in accordance with the usual practice. The spring also comprises the shorter reinforcing leaves 12, 13, 14, 15 and 16, the lengths of these leaves progressively decreasing in accordance with the usual practice.

In order to hold the leaves in their proper nested relation and prevent them from separating during the flexing movements of the spring, it is customary to provide a plurality of spring clips in properly spaced relation, longitudinally of the spring, and my present invention relates to the clips and the means for retaining them in their proper position. At 17 I have shown a spring clip which consists of a U-shaped member and a bolt 18 which completely surrounds the leaves. My improved method of securing the clip, as applied to the clip 17, consists in offsetting the end of the leaf 15, as shown at 19, to provide a space 20 through which the portion 21 of the clip extends. The extent to which the end 19 is offset is preferably slightly less than the thickness of the part 21 of the clip so that the portion 21 will be clamped between the offset 19 and the adjacent surface of the leaf 14. The clip 17 is secured in the space 20 by interengaging means on one of the leaves and the part 21 of the clip and, as shown in Figs. 1 and 2, such interengaging means consists of a nib or projection 22 on the offset 19 and an opening 23 in the part 21 of the clip. The projection 22 is preferably formed by means of a die which produces a depression 24 in the outer surface of the offset 19 and this operation may be performed in connection with the forging operation for making the offset 19 so that the offset and the depression 24 will be formed by a single stroke of a forging machine operating on the end of the leaf 15 which should be heated to a forging temperature, in order to facilitate the operation. The opening 23 may be formed by an ordinary punching operation.

In assembling the clip 17 the end of the leaf 15 is pried away from the leaf 14 sufficiently to permit the portion 21 of the clip 17 to be inserted in the space 20 and to bring the opening 23 into registration with the projection 22. The end of the leaf 15 is then allowed to assume its normal position as shown in Fig. 1, which will clamp the part 21 and thereby prevent any rattling or clicking of the leaves when in use. The bolt 18 is then inserted and the parts will thereby be properly secured together.

In Fig. 3 I have illustrated another form of clip in which the portion 25 is provided with an opening 26, as before, and the offset 27, in the end of the leaf 13, is provided with a nib or projection 28 engaging the opening 26. Instead of using the bolt 18, the ends 29, of the clip, are bent over the upper surface of the main leaf 10 to form a clench. In other respects the construction is similar to that shown in Fig. 2.

While I have illustrated and described what I now consider to be the preferred form of my invention, it is obvious that the precise arrangement and location of the interengaging parts for preventing the clips from being displaced longitudinally of the spring are subject to variation without departing from the spirit of the invention, as defined in the appended claims.

Having thus described my invention, what I claim is:

1. In a multiple-leaf spring, the combination of a plurality of leaves of different lengths one of the shorter of which has its end offset from the adjoining longer leaf to provide a space therebetween, and a clip extending through said space and around a plurality of said leaves to secure them together, the thickness of the portion of said clip that extends through said space being greater than the depth of said offset so that the clip will be clamped between the leaves forming said space, said clip and one of said leaves having interengaging means comprising a projection on one and an opening in the other whereby said clip is retained in position and said shorter leaf being free from the clamping action of said clip.

2. In a multiple-leaf spring, the combination of a plurality of leaves of different lengths one of the shorter of which has its end offset from the adjoining longer leaf to provide a space therebetween, and a clip extending through said space and around a plurality of said leaves to secure them together, the thickness of the portion of said clip that extends through said space being greater than the depth of said offset so that the clip will be clamped between the leaves forming said space, said clip and one of said leaves having interengaging means whereby said clip is retained in position, and said shorter leaf being free from the clamping action of said clip.

In testimony whereof, I hereunto affix my signature.

WILLIAM H. WALLACE.